(12) United States Patent
Xu et al.

(10) Patent No.: US 11,510,400 B2
(45) Date of Patent: Nov. 29, 2022

(54) KIND OF SPINNING FISHING REEL

(71) Applicant: Guangzhou Huiyue Trading Co., Ltd., Guangzhou (CN)

(72) Inventors: Changlin Xu, Yangzhou (CN); Hui Li, Guangzhou (CN); Junrong Yang, Yangzhou (CN)

(73) Assignee: GUANGZHOU HUIYUE TRADING CO., LTD., Guangzhou (CN)

( * ) Notice: Subject to any disclaimer, the term of this patent is extended or adjusted under 35 U.S.C. 154(b) by 0 days.

(21) Appl. No.: 17/386,321

(22) Filed: Jul. 27, 2021

(65) Prior Publication Data
US 2022/0053746 A1  Feb. 24, 2022

(30) Foreign Application Priority Data
Aug. 24, 2020  (CN) .......................... 2020108553291

(51) Int. Cl.
*A01K 89/01* (2006.01)
*A01K 89/015* (2006.01)
*A01K 89/00* (2006.01)

(52) U.S. Cl.
CPC ........ *A01K 89/0183* (2015.05); *A01K 89/006* (2013.01)

(58) Field of Classification Search
CPC ........ A01K 89/01141; A01K 89/01143; A01K 89/0192; A01K 89/019125; A01K 89/01917
See application file for complete search history.

(56) References Cited

U.S. PATENT DOCUMENTS

2015/0048192 A1 * 2/2015 Matsuo ............. A01K 89/0114
242/241

FOREIGN PATENT DOCUMENTS

EP         3245868 A1 * 11/2017 .......... A01K 89/006
WO  WO-2017104837 A1 *  6/2017 ............. A01K 89/01

* cited by examiner

*Primary Examiner* — Emmanuel M Marcelo
(74) *Attorney, Agent, or Firm* — McClure, Qualey & Rodack, LLP

(57) ABSTRACT

The present invention discloses a spinning reel. The spinning reel includes a gear sleeve, said gear sleeve is provided with a helical gear, the main body is pivoted with an face gear for driving the rotation of the helical gear, the face gear is connected with a driving mechanism, said gear sleeve is coaxially penetrated with a main shaft sliding axially inside it, a transmission structure is provided between the gear sleeve and the main shaft for driving the synchronous rotation of the main shaft, a reciprocating driving mechanism is provided between said driving mechanism and the main shaft for driving the main shaft reciprocating drive mechanism for moving the main shaft back and forth, the main shaft is fixed with a spool for winding the fishing line, and the main body is fixed with a winding guide for guiding the fish line to the spool.

5 Claims, 3 Drawing Sheets

KIND OF SPINNING FISHING REEL

FIELD OF THE INVENTION

The present invention relates to fishing reels, and in particular to a spinning reel.

BACKGROUND TECHNOLOGY

The spinning reel is one of the common fishing reels, which is widely used because it is easy to use and easy to get started. For a long time, winding fishing line on the spinning reel is the rotor rotating around the main shaft continuously, while superimposed on the axial reciprocating motion of the spool, then the fishing line is winded on the spool orderly. As for this structure, at the same time retrieving fishing line, the rotor continuous rotation, and constantly tangle the fishing line to increase the torque, after a long time use, it will happen that fishing line is getting knot in the air automatically when casting. It will seriously affect the casting, and even cause personal injury, endangering the safety of the user. The industry has not been a structural solution, so it become a "persistent problem" of spinning reel.

In addition, the continuous rotation of the rotor not only adds torque to the line and generates tangling, but also requires the rotor to maintain good dynamic balance to avoid additional shaking of the spinning reel when rotating the handle arm. Therefore, in actual production, it is often necessary to add balance weight to the rotor to meet the demand of dynamic balance. This not only makes the structure of the spinning reel complicated and increases the manufacturing cost, but also adds extra weight to the spinning reel, which is contrary to the development direction of light weight.

CONTENT OF THE INVENTION

The purpose of the present invention is to provide a kind of spinning reel that avoids tangling of fishing line, and lightweight, in response to the deficiencies of the prior art.

To achieve the above purpose, the technical solution of the present invention of the spinning reel is:

A spinning reel type fishing reel, comprising a main body, said main body pivoted with a gear sleeve, said gear sleeve provided with a helical gear, the main body pivoted with an face gear driving the rotation of the helical gear, the face gear connected with a driving mechanism, said gear sleeve coaxially penetrating with a main shaft sliding axially inside it, a transmission structure driving synchronous rotation of the main shaft provided between the gear sleeve and the main shaft, said driving mechanism and the main shaft are provided with a reciprocating driving mechanism to drive the main shaft to move back and forth, the main shaft is fixed with a spool for winding fishing line, and the main body is fixed with a winding guide to guide the fishing line to the reel. The spool moves back and forth with the main shaft driven by the reciprocating driving mechanism, while the face gear engages the helical gear, and the sleeve rotates around its axis under the action of the driving mechanism, and the driving mechanism drives the spool and the main shaft to rotate synchronously with the sleeve, and the fishing line is winded orderly through the winding guide. The winding guide is fixed to the main body at this time, eliminating the additional torque applied to the fishing line by the rotor rotation and avoiding the tangling issue of long-term use of the fishing line. The winding guide is lighter than rotor which reduces the overall weight of the reel and reduces the manufacturing cost too.

Preferably, said reciprocating driving mechanism includes a first driving gear coaxially fixed to the face gear, a first driven gear pivotally connected to the main body. The first driving gear meshes with the first driven gear, said first driven gear has an eccentric column, the main shaft is pivotally connected with a sliding block, said sliding block is provided with a sliding groove cooperating with the eccentric column, the eccentric column is inserted into the sliding groove to drive the sliding block and the main shaft to move reciprocally.

Preferably, said reciprocating driving mechanism comprises a crankshaft fixed to the face gear but with a different axis, said crankshaft being hinged to the main shaft through a connecting rod, forming a crank slider mechanism to drive the main shaft to slide axially reciprocating in the gear sleeve.

Preferably, said reciprocating driving mechanism includes a reciprocating shaft pivoted to the main body, said reciprocating shaft is parallel to the main shaft, the reciprocating shaft is provided with a reciprocating line, the reciprocating shaft is snapped to a reciprocating block that fits the reciprocating line, the reciprocating block is fixed to the main shaft, the reciprocating shaft is driven by the helical gear through a driven helical gear, said main body is also provided with a guide shaft parallel to the main shaft for guiding the reciprocating block, the rotation of the reciprocating shaft drives the reciprocating block and the main shaft to move back and forth.

Preferably, the transmission structure of the gear sleeve driving the synchronous rotation of the main shaft includes a spline and a spline groove, a flat shaft and a flat sleeve, a linear groove and a linear key provided between the main shaft and the gear sleeve. Preferably for the flat shaft and flat shaft sleeve because of easy to process and easy to assemble.

The present invention has the following advantages compared with the prior art:

The spool moves back and forth with the main shaft driven by the reciprocating drive mechanism, while the face gear engages the helical gear, in the role of the drive mechanism, the sleeve rotates around its axis, the transmission mechanism drives the spool and main shaft synchronous rotating with the sleeve, the fishing line is winded onto spool orderly through the winding guide, the winding guide is fixed with the main body to remain unmoving, eliminating the rotor's additional torque applied to the fishing line, to avoid the fishing line tangle issue of long time use. The winding guide also does not need extra weight, which reduces the overall weight of the reel and lowers the manufacturing cost of the reel.

Wherein, 1 body, 2 gear sleeve, 21 helical gear, 22 flat shaft sleeve, 3 main shaft, 31 flat shaft, 4 face gear, 5 handle, 6 spool, 7 winding guide, a1 first driving gear, a2 first driven gear, a21 eccentric column, a3 sliding block, a31 sliding groove, b1 crankshaft, b2 connecting rod, c1 reciprocating shaft, c11 reciprocating line, c2 reciprocating block, c3 driven helical gear, c4 guide shaft.

DESCRIPTION OF THE IMPLEMENTATIONS

The present invention is further elucidated hereinafter in conjunction with the accompanying drawings and specific embodiments, it being understood that these embodiments are intended only to illustrate the invention and not to limit the scope of the invention, and that after reading the invention, various equivalent forms of modification of the invention by a person skilled in the art fall within the scope defined by the claims appended to this application.

Figure 1:
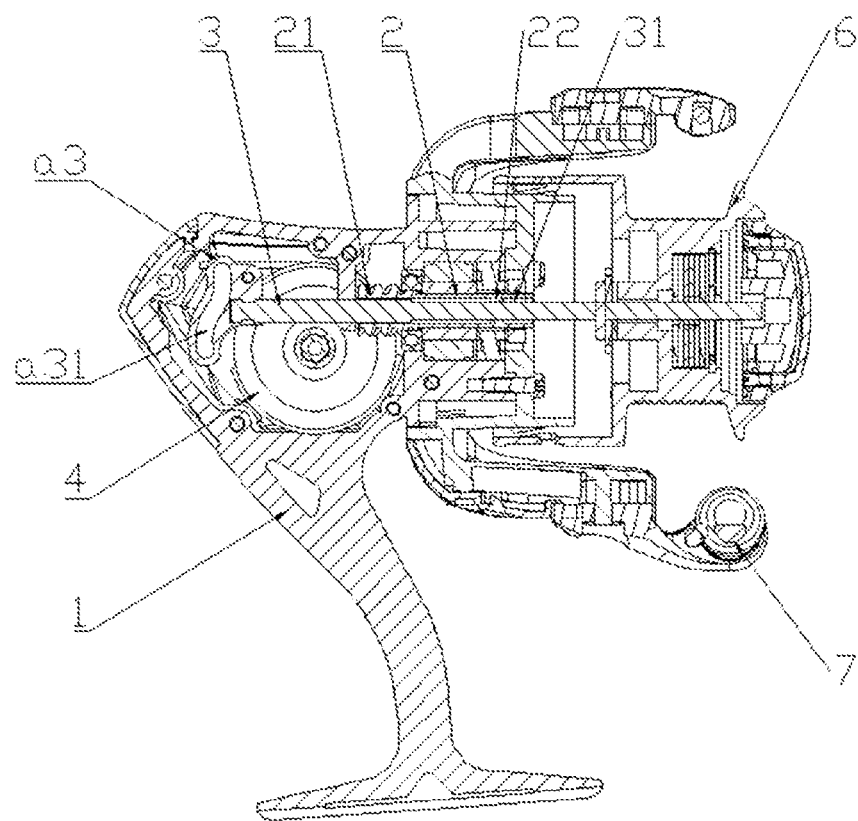
FIG. 1 is a schematic diagram of the structure of a spinning reel of implementation 1.
Figure 2:
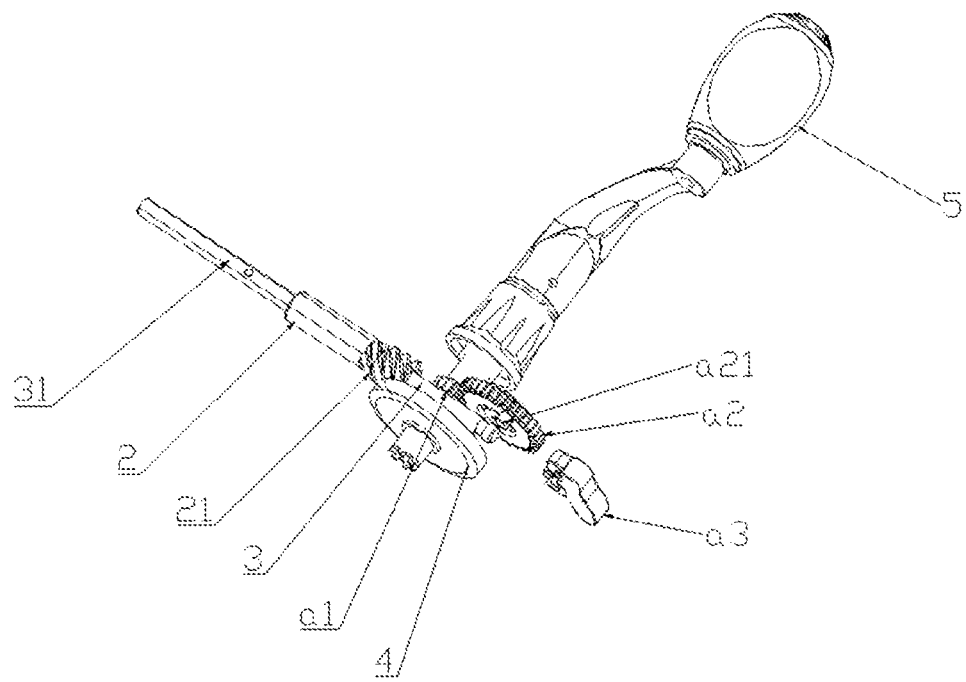
FIG. 2 is a schematic diagram of the structure of the reciprocating drive mechanism of implementation 1.
Figure 3:
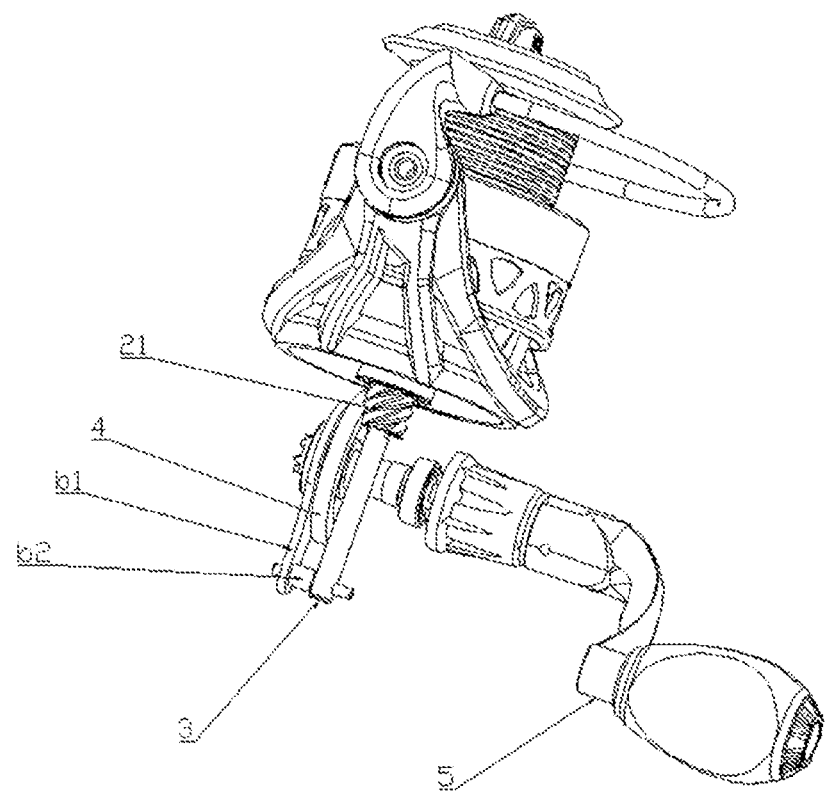
FIG. 3 is a schematic diagram of the structure of the reciprocating drive mechanism of implementation 2.
Figure 4:
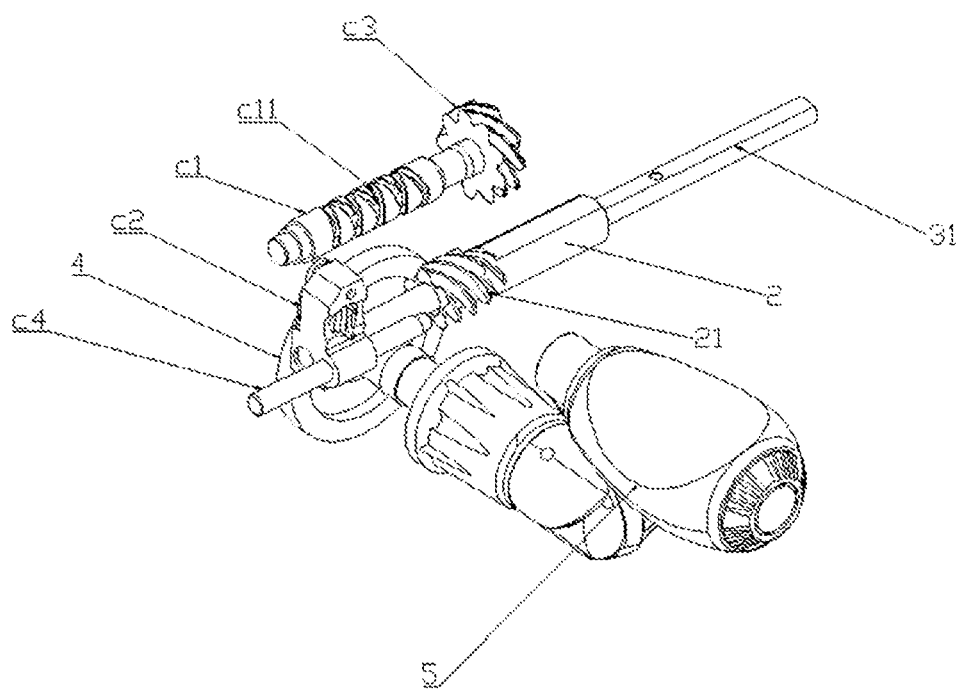
FIG. 4 is a schematic diagram of the structure of the reciprocating drive mechanism of implementation 3.

Implementation 1:

As shown in FIG. 1, a spinning reel includes a main body 1, the main body is pivoted to a gear sleeve 2, a helical gear 21 is arranged in the rear section of the gear sleeve, the gear sleeve runs coaxially through the main shaft 3, the main shaft can slide along its axis inside the gear sleeve, a transmission structure is arranged between the gear sleeve and the main shaft to drive the main shaft to rotate synchronously, the transmission mechanism includes a flat shaft 31 arranged in the front section of the main shaft and a flat shaft sleeve 22 arranged inside the gear sleeve. The main body is pivotally connected to the face gear 4 that drives the helical gear to rotate, and the face gear is connected to the driving mechanism. The drive mechanism includes a handle 5, the handle is connected to a reciprocating drive mechanism, the reciprocating drive mechanism includes a first driving gear a1 coaxially fixed to the face gear, a first driven gear a2 pivotally connected to the main body, the first driving gear engages with the first driven gear, the first driven gear is arranged with an eccentric column a21, the eccentric column is snapped to the sliding block a3, the sliding block is internally pivoted to the end of the main shaft, the front end of the main shaft is fixed to the spool 6 for winding the fishing line, the sliding block is provided with a slide groove a31 that fits with the eccentric column, the eccentric column is inserted in the slide groove to drive the sliding block and the main shaft to move reciprocally, and the front end of the main body is fixed to the winding guide 7 that guides the fishing line to the spool.

The specific working process and principle of implementation one: turn the handle to drive the face gear rotation, the face gear engages the helical gear, the flat shaft of the main shaft match with the flat shaft of the gear sleeve, so that the gear sleeve, the main shaft and the spool fixed in the front of the main shaft rotate around the main shaft axis synchronously, while the first driving gear engages the first driven gear, the sliding block attached to the outside of the eccentric column rotates with the first driven gear, driving the main shaft and the spool to reciprocate along the main shaft axis. Fishing line is winded onto spool orderly, while the winding guide is fixed to the main body and remains unmoved, eliminating the extra torque applied to the fishing line, avoiding the tangle phenomenon of the fishing line after long-term use, and making the retrieve smoother, and the winding guide does not need extra weight, reducing the overall weight of the reel and lowering the manufacturing cost of the reel.

Implementation 2:

As shown in FIG. 1, a spinning reel includes a main body 1, the main body is pivoted to a gear sleeve 2, the rear section of the gear sleeve is arranged with a helical gear 21, the gear sleeve runs through the main shaft 3 coaxially, the main shaft can slide along its axis inside the gear sleeve, a transmission structure is arranged between the gear sleeve and the main shaft to drive the main shaft to rotate synchronously, the transmission mechanism includes a flat shaft 31 arranged in the front section of the main shaft and a flat shaft sleeve 22 arranged inside the gear sleeve. The main body is pivotally connected to the face gear 4 driving the rotation of the helical gear, the face gear is connected to the driving mechanism, the driving mechanism includes a handle 5, the handle is connected to the reciprocating drive mechanism, the reciprocating driving mechanism includes a crankshaft b1 fixed to the face gear but different axis, the crankshaft is hinged to the rear end of the main shaft through a connecting rod b2, forming a crank slider mechanism, driving the main shaft to slide axially in the gear sleeve, the front end of the main shaft is fixed to the spool 6 for winding the fishing line, and the front end of the main body is fixed to the winding guide 7, which guides the fishing line to the spool.

The specific working process and principle of implementation two: turn the handle, drive the face gear rotation, the face gear engages the helical gear, the flat shaft of the main shaft sleeve with the flat shaft of the gear sleeve, so that the gear sleeve, the main shaft and the spool fixed to the front of the main shaft rotates around the main shaft axis synchronously, while the crankshaft through the connecting rod to do cranking movement, the connecting rod drives the main shaft and the spool along the main shaft axis reciprocating movement, the fishing line is winded to spool orderly through the winding guide. The winding guide is fixed to the main body and remains unmoved, eliminating the additional torque applied to fishing line by the winding guide, avoiding the tangle issue of fishing line after long-term use, making smoother retrieve and the winding guide is unnecessary as same weight as previously, reducing the overall weight of the reel and lower the manufacturing cost of the reel.

Implementation 3:

As shown in FIG. 1, a spinning reel includes a main body 1, a gear sleeve 2 pivoted on the main body, a helical gear 21 arranged in the rear section of the gear sleeve, a coaxial gear sleeve running through the main shaft 3, the main shaft sliding along its axis inside the gear sleeve, a transmission structure driving the synchronous rotation of the main shaft arranged between the gear sleeve and the main shaft, a transmission mechanism including a flat shaft 31 arranged in the front section of the main shaft and a flat shaft sleeve 22 arranged inside the gear sleeve. The main body is pivotally connected to an face gear 4 driving the rotation of the helical gear, the face gear is connected to a driving mechanism, the driving mechanism includes a handle 5, the handle is connected to a reciprocating driving mechanism, the reciprocating driving mechanism includes a reciprocating shaft c1 pivotally connected to the main body, the reciprocating shaft is parallel to the main shaft, the reciprocating shaft is arranged with a reciprocating line c11, the reciprocating shaft is snapped to a reciprocating block c2 cooperating with the reciprocating line, the reciprocating block is fixed to the end of the main shaft, The front end of the main shaft is fixedly connected with a spool 6 for winding fishing line, and the reciprocating shaft is driven by meshing with the helical gear through the driven helical gear c3. The main body is also installed with a guide shaft c4 parallel to the main shaft for guiding the reciprocating block, and the rotation of the reciprocating shaft drives the reciprocating block and the main shaft to move reciprocally, and the front end of the main body is fixed with the winding guide 7 for guiding the fishing line to the spool.

The specific working process and principle of implementation 3: turn the handle, drive the face gear rotation, the face gear engages the helical gear, the flat shaft of the main shaft sleeve with the flat shaft of the gear sleeve, so that the gear sleeve, the main shaft and the spool fixed to the front of the main shaft synchronously rotate around the main shaft axis, while the helical gear engages the driven helical gear, driving the reciprocating shaft rotation, reciprocating line drive reciprocating block to move, reciprocating block drive the main shaft and spool together to do reciprocating movement. The fishing line is winded in orderly through winding guide. The winding guide is fixed to the main body and remains unmoved, eliminating the additional torque applied to the fishing line, avoiding the tangle issue of fishing line after long-term use. And making a smoother retrieve, and the winding guide does not need extra weight, reducing the overall weight of the reel and lower the manufacturing cost.

The invention claimed is:

1. A spinning reel type fishing reel, comprising a main body, characterized in that: the main body is pivotally connected with a gear sleeve, the gear sleeve is provided with a helical gear, and the main body is pivotally connected with a face gear that drives the helical gear to rotate, the face gear and a drive mechanism are connected, the gear sleeve is coaxially penetrated with a main shaft sliding axially inside the gear sleeve, a transmission structure for driving the main shaft to rotate synchronously is arranged between the gear sleeve and the main shaft, said drive mechanism and the main shaft are provided with a reciprocating drive mechanism to drive the main shaft to move reciprocally, the main shaft is fixedly connected with a spool for winding a fishing line, and the main body is fixedly connected with a winding guide for guiding the fishing line to the spool.

2. The spinning fishing reel according to claim 1, wherein the reciprocating drive mechanism comprises a first driving gear coaxially fixed to the face gear, a first driven gear pivotally connected to the main body, the first driving gear meshes with the first driven gear for transmission, the first driven gear is fixedly provided with an eccentric column, the main shaft is pivotally connected with a sliding block, and the sliding block is provided with a sliding groove that cooperates with the eccentric column, and the eccentric column is inserted in the sliding groove to drive the sliding block and the main shaft to move back and forth.

3. The spinning fishing reel according to claim 1, characterized in that: the reciprocating drive mechanism comprises a crankshaft fixedly connected to the face gear but different axis, the crankshaft is hinged with the main shaft through a connecting rod to form a crank slip block mechanism, and drives the main shaft to reciprocate axially in the gear sleeve.

4. The spinning fishing reel according to claim 1, wherein the reciprocating drive mechanism comprises a reciprocating shaft pivotally connected to the main body, the reciprocating shaft is parallel to the main shaft, the reciprocating shaft is provided with a reciprocating line, and a reciprocating shaft sleeve with a reciprocating block matched with the reciprocating line, the reciprocating block is fixedly connected to the main shaft, the reciprocating shaft is driven by a driven helical gear meshing with the helical gear, the main body is also provided with a guide shaft parallel to the main shaft for guiding the reciprocating block, the rotation of the reciprocating shaft drives the reciprocating block and the main shaft to move back and forth.

5. The spinning fishing reel according to claim 1, characterized in that: the gear sleeve drives the main shaft to rotate synchronously and the transmission structure includes splines and spline grooves, flat shafts and flat shaft sleeves, linear grooves and linear keys arranged between the main shaft and the gear sleeve.

* * * * *